United States Patent
Davis (10) Patent No.: US 8,799,898 B2
(45) Date of Patent: Aug. 5, 2014

(54) METHODS AND APPARATUS FOR BINDING APPLICATIONS TO A CLOUD COMPUTING ENVIRONMENT

(75) Inventor: Andrew G. Davis, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 197 days.

(21) Appl. No.: 13/149,822

(22) Filed: May 31, 2011

(65) Prior Publication Data

US 2013/0132944 A1 May 23, 2013

(51) Int. Cl.
G06F 9/455 (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 8,238,256 B2 | 8/2012 | Nugent | |
| 2005/0108727 A1* | 5/2005 | Bernstein et al. | 719/320 |
| 2005/0149947 A1* | 7/2005 | Callender | 719/321 |
| 2005/0228770 A1* | 10/2005 | Willamson et al. | 707/1 |
| 2009/0183010 A1* | 7/2009 | Schnell et al. | 713/193 |
| 2009/0199178 A1* | 8/2009 | Keller et al. | 718/1 |
| 2010/0077063 A1* | 3/2010 | Amit et al. | 709/221 |
| 2010/0146085 A1* | 6/2010 | Van Wie et al. | 709/220 |
| 2010/0281102 A1* | 11/2010 | Chinta et al. | 709/203 |
| 2011/0173251 A1* | 7/2011 | Sandhu et al. | 709/203 |
| 2011/0185013 A1* | 7/2011 | Obata et al. | 709/203 |
| 2011/0265164 A1 | 10/2011 | Lucovsky et al. | |

FOREIGN PATENT DOCUMENTS

EP 1508855 2/2005

OTHER PUBLICATIONS

Jorge Orchilles, "Microsoft Windows 7 Adminstrator's Reference", Apr. 28, 2010, Syngress, Chapter Title: Loading Windows XP Mode.*

* cited by examiner

Primary Examiner — Emerson Puente
Assistant Examiner — Steven Do
(74) Attorney, Agent, or Firm — Wolfe-SBMC (57) ABSTRACT

Methods and apparatus for binding an application to a virtual computing instance within a multi-tenant virtual computing environment. In one embodiment, an application binding system may include, among other elements, creating a dependence between at least some functionality of an application to a kernel-level component within the virtual computing instance.

21 Claims, 6 Drawing Sheets

METHODS AND APPARATUS FOR BINDING APPLICATIONS TO A CLOUD COMPUTING ENVIRONMENT

BACKGROUND

Cloud computing environments can provide access to computing resources to users unwilling or unable to invest in the computing infrastructure to support computing resource needs. Cloud computing allows user to pay for only the computing resources they want, and to flexibly scale their resource usage up or down. Cloud computing environments often provide users with control within a virtual computing instance created to satisfy computing needs. Within a virtual computing instance, a user is able to invoke and use various software applications. The control provided to users within a cloud computing environment may make it difficult to prevent users from making unauthorized copies of software applications provided within the cloud computing environment.

SUMMARY

In one embodiment, an application binding system may receive a request from a user to execute an application within a virtual computing instance. In this embodiment, in response to receiving the request, the application binding system may load a kernel-level component within the virtual computing instance, where the user is denied access to the virtual computing instance while the kernel-level component is being loaded and where at least some functionality of the application is enabled by the kernel-level component. In this embodiment, in response to receiving the request, the application binding system may load the application within the virtual computing instance. In this embodiment, in response to the completion of the kernel-level component being loaded, the application binding system may allow the user to access the virtual computing instance, where the functionality of the application enabled by the kernel-level component is enabled through communication between the application and the kernel-level component, and where the user does not have access to a binary or executable version of the kernel-level component.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments of methods and apparatus are provided for binding an application to a virtual computing instance. Binding an application to a virtual computing instance may include, among other elements, creating a dependence between at least some functionality of an application to the virtual computing instance.

In some embodiments, a user with access to a virtual computing instance, created by a cloud computing environment, may be denied access to the virtual computing instance while a kernel-level component is loaded. The kernel-level component enables at least some functionality of an application that has been requested by the user to execute within the virtual computing instance. Once the kernel-level component has been loaded within the virtual computing instance, the user is again allowed access to the virtual computing instance. However, the user may not have access to an executable or binary version of the kernel-level component.

In some embodiments, the application requested by the user, loaded into virtual computing instance, may enable at least some functionality by communicating with the kernel-level component. However, in some embodiments, even without communicating with the kernel-level component, the application may provide some level of functionality to the user.

Given control over a virtual computing instance, a user may copy and port the application from the original virtual computing instance to another computing platform. However, given the state of the virtual computing instance after loading the application and kernel-level component as described below, one result may be that the user may not copy a binary version of the kernel-level component to another computing platform, thereby preventing the user from using at least some functionality of a copy of the application ported to the other computing platform. In other words, denying a user the ability to copy a binary version of the kernel-level component prevents the user from using the full functionality of an application copied to another computing platform, if the application has been bound to the kernel-level component.

Further, given a kernel-level component as described within this application, some embodiments of the application binding system may prevent unauthorized copies of applications from providing full functionality without using any type of license file. Any software application may be modified to operate in conjunction with the application binding system described below, and one example may be Adobe® Flash® Media Server. Generally, any network-based content application provided by a third party may be bound to a virtual computing instance with the disclosed application binding system.

In the following detailed description, numerous details are set forth to provide a thorough understanding of claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Multi-Tenant Virtual Computing Environment

Figure 1:
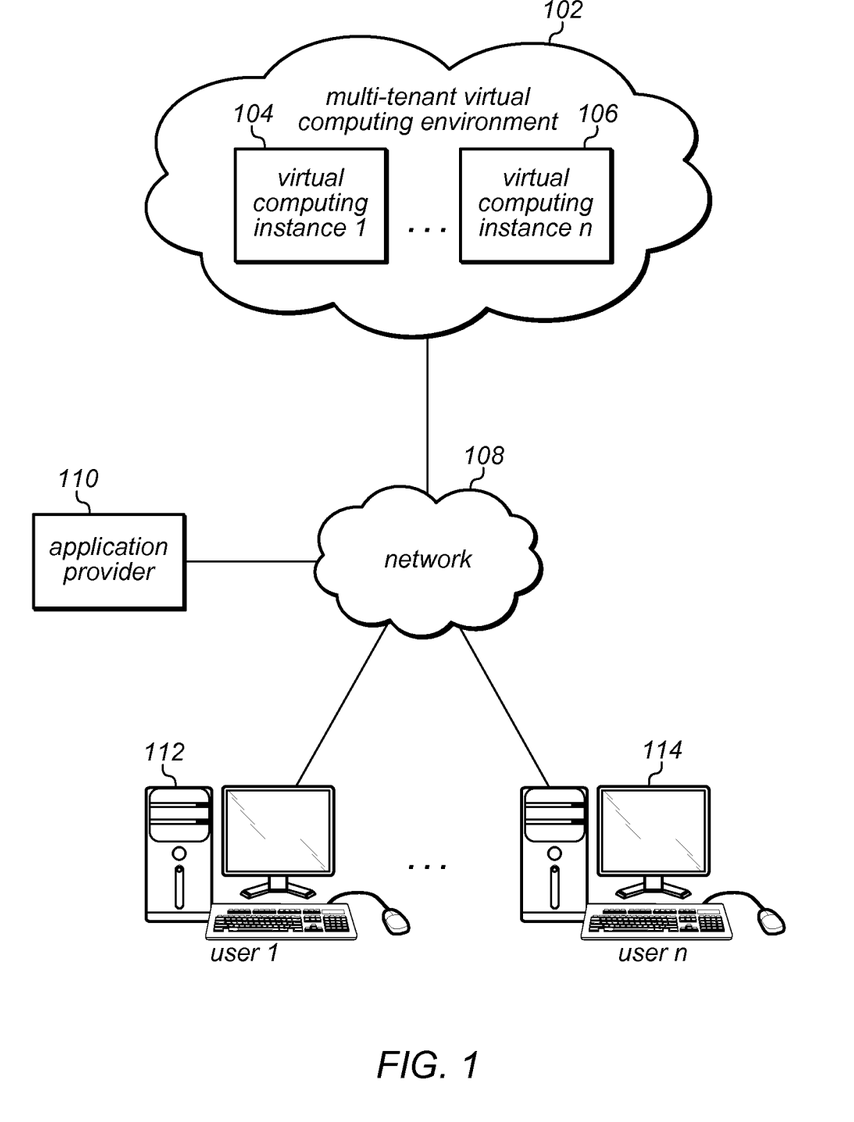
FIG. 1 illustrates a multi-tenant virtual computing environment, according to some embodiments.

FIG. 1 depicts an example multi-tenant virtual computing environment suitable for embodiments of the application binding system. For example, the processing steps described below with respect to FIG. 2, may be executed on various aspects of the computing environment presented within FIG. 1.

Figure 2:
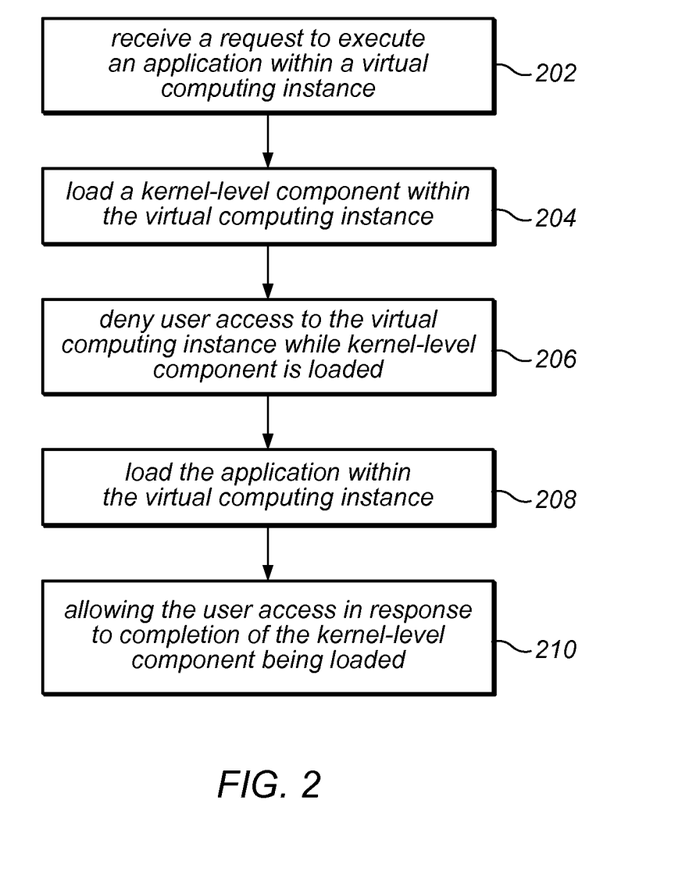
FIG. 2 depicts a flowchart of certain processing steps of an embodiment of the application binding system.

A user request, as in step 202 of FIG. 2, to execute an application may be received from any of the users depicted by elements 112 and 114. User 112, for example, may submit a request through a web services interface provided over network 108 by the multi-tenant virtual computing environment 102.

At step 204, a kernel-level component is loaded within a virtual computing instance, and in this example that may be virtual computing instance 104. In embodiments of the application binding system, kernel-level operation indicates execution within and use of a memory space that is inaccessible to users with regular privileges. Further, within some embodiments, a process or component that operates at the kernel-level, may only exist as compiled and linked program instructions that are only stored within execution, or runtime memory.

Elements 104 and 106 represent virtual computing instances, and any one of these may have been created in response to receiving the request from the user to execute the application. Alternatively, the user may first request access to a virtual computing instance, at which point the multi-tenant virtual computing environment may create virtual computing instance 304, and later the user may request to execute the application.

While the kernel-level component is being loaded, user 112 is denied access to virtual computing instance 104, as indicated by step 206. In response to the user request to execute the application, a hypervisor executing within multi-tenant computing environment 102 may request the application from application provider 110. Alternatively, the hypervisor may have local access to the application, and may load the application within virtual computing instance 104 from local servers or local storage. This loading of the application is reflected in step 208.

In response to completion of the loading of the kernel-level component within virtual computing instance 104, user 112 may be granted access to the virtual computing instance 104 and to the loaded application. In the case that virtual computing instance 104 was created in response to the request to execute the application, this granting of access may be the first access user 112 has to virtual computing instance 104. In the case that user 112 had access to virtual computing instance 104 before requesting execution of the application, the user access granted may be a restoration of access.

Example Embodiment: Loading an Application and Kernel-Level Component

FIG. 2 illustrates certain processing steps of the application binding system that may be performed by a hypervisor executing within a cloud computing environment. A hypervisor may be a process executing within the could computing environment responsible for the management of virtual computing instances, and for simplicity, the management of the virtual computing instances is referred to as being performed by the hypervisor. However, in other embodiments, the disclosed functions attributed to the hypervisor may be performed by any single or combination of processes executing within the cloud computing environment.

One method by which a user may request access to cloud computing resources is via a web services interface. An example of such a request may be seen in step 202, where a user request is received to execute an application within a virtual computing instance. A virtual computing instance may be created by a hypervisor within the cloud computing environment, and in some embodiments, the creation of the virtual computing instance may be performed in response to the request to execute the application. In other embodiments, a virtual computing instance may already exist, and while operating within the virtual computing instance, the user may request an application to be loaded.

In response to the user request to execute an application, the hypervisor may load a kernel-level component within the virtual computing instance. In other embodiments, a process or processes other than, or in addition to, the hypervisor may handle user requests and loading of the kernel-level component or application. Loading of the kernel-level component is reflected in step 204. While the hypervisor is loading the kernel-level component, the user may be denied access to the virtual computing instance, as reflected in step 206. In other embodiments, access may be denied by default from the beginning, in which case, step 206 becomes unnecessary.

Also in response to the user request to execute an application, the hypervisor may load the application within the virtual computing instance. The loading of the application may occur either while the user is denied access to the virtual computing instance or while the user has access to the virtual computing instance. The application may provide a variety of types or levels of functionality, and at least some of the functionality may be enabled by the kernel-level component.

Once the kernel-level component has been loaded into the virtual computing instance, the user may be allowed to access the virtual computing instance, as reflected in step 210. However, at least some of the functionality of the application is enabled through communication between the application and the kernel-level component, and may not yet be enabled.

Further, even though the user has been granted access to the virtual computing instance, the user does not have access to a binary or executable version of the kernel-level component. In one embodiment, the hypervisor, or another process within the cloud computing environment deletes any executable files, object files, or any other files used to build the kernel-level component from the file system before allowing the user access to the virtual computing instance. If the kernel-level component has been built into the operating system, there may be no executable files to delete or for a user to access. However, if the kernel-level component is a driver, and the driver is loaded after the virtual computing instance has been created, then there may exist object files or binary files that are used to load the driver into the kernel of the virtual computing instance. In this example, the object files or modules used to load the kernel-level component are deleted or otherwise removed from being read from the file system after the kernel-level component is loaded and before the user is granted access to the virtual computing instance. In other embodiments, the hypervisor may remove all files related to the kernel-level component that are outside of runtime memory.

In other embodiments based on the hypervisor loading the kernel-level component within the virtual computing instance, the hypervisor may also provide a seed value to the kernel-level component and to the application. Seed values may be used in symmetric encryption of communications between the kernel-level component and the application. The seed value may be used by the kernel-level component and the application to encrypt and decrypt communications. In some embodiments, the hypervisor may periodically or aperiodically deny access to the user while the kernel-level component or application is reseeded. This reseeding may prevent a user from creating a process that mimics the operation of the kernel-level component, and thereby maintaining the functionality of the application through the use of a process imitating the kernel-level component.

This high level description of the application binding system presents the loading of the application and the kernel-level component, and the state of the virtual computing instance upon allowing the user access after the kernel-level component has been loaded. However, in some embodiments, at least some of the functionality of the application has not yet been enabled, and the below examples provide additional information on how the functionality of the application dependent upon the kernel-level component is enabled.

Example Embodiment: Enabling Application Functionality

An application requested by a user to execute within a virtual computing instance may be any type of application. Applications may offer different levels of functionality. For example, an application may offer levels of functionality that may be activated depending on the purchase price. Other applications may be promotional and may disable functionality such as the save function.

As described above with respect to FIG. 2, an application loaded into a virtual computing instance may have at least some functionality that is enabled by a kernel-level component within the virtual computing instance. In some embodiments, the functionality within the application enabled by the kernel-level component is enabled through communication between the application and the kernel-level component.

In other embodiments, an application may be loaded as a fully functional application, and at least some of the functionality of the application may be disabled in response to a lack of communication between the application and the kernel-level component.

In one embodiment, as soon as the application is loaded, the application may initiate communication with the kernel-level component to establish the functionality level the application may offer. For example, the application may send a message to the kernel-level component with application information and user identification information. The kernel-level component, when it receives the message from the application, may access data providing access level information for the application given the particular user. The kernel-level component may then transmit a response message to the application that includes the access level information for the given user. On receiving the message from the kernel-level component, the application may then enable the functionality specified by the information included within the message. Alternatively, the application may not include the user identification information, and the kernel-level component may use the application information to identify the user of the application.

As noted above, any application may be requested by a user and loadable within a virtual computing instance. However, the application may require modifications to operate in conjunction with the kernel-level component. To communicate with the kernel-level component, the application may be modified to introduce the ability to disable at least some functionality until it is enabled by the kernel-level component, and the application may also be modified to communicate with the kernel-level component.

Within the scheme of enabling some functionality of an application after communicating with a kernel-level component, many options exist that may provide sufficient security so as to prevent the application from enabling the kernel-level component-enabled functionality without actually communicating with the kernel-level component. One method may be that the hypervisor, when loading the kernel-level component, provides the application and the kernel-level component with one or more seed values, which may be used to generate authentication values to be included within communications between the kernel-level component and the application. In this embodiment, if the application receives a message from the kernel-level component that includes an authentication value that is inconsistent with the seed value or values provided by the hypervisor, the application may consider the message invalid and not enable any functionality that would have otherwise been enabled by an authentic message. In the case that the kernel-level component is already built into an operating system executing within the virtual computing instance, there may be no point during which the kernel-level component itself is loaded, and in this case, the hypervisor seeds the application at the time it is loaded and simply provides the already-loaded kernel-level component with seed information.

In some embodiments, the kernel-level component may verify that the user has permission to enable the additional functionality provided by a response message to the application. In other embodiments, before sending a response message to the application, the kernel-level component may verify that the virtual computing instance provides a computing environment suitable to support the functionality that may be enabled by the response message.

Another method for ensuring secure communication between an application and the kernel-level component is to make use of asymmetric, public key encryption. In such an embodiment, the hypervisor may provide the application with the public key of the kernel-level component. The application may use the public key to encrypt communications transmitted to the kernel-level component. The kernel-level component, when it receives a message from the application may decrypt the message using the public key and its own private key. If the kernel-level component successfully decrypts the message from the application, it may respond with a message to enable the kernel-level component-enabled functionality of the application. Seed values and public keys are only two methods for ensuring secure communication between the application and kernel-level component, and other methods may be incorporated within the application binding system.

In some embodiments, the application may enable all kernel-level component-enabled functionality after a single message exchange with the kernel-level component. In other embodiments, the application may communicate with the kernel-level component each time a user attempts to access functionality that has not yet been enabled by communication with the kernel-level component. In other embodiments, using either of the two previous methods, the application may periodically or aperiodically communicate with the kernel-level component to maintain that enabled functionality remain enabled.

In some embodiments, a user may increase or decrease service levels during the life of a virtual computing instance executing an application. In such a case, the kernel-level component, upon receiving a request to enable certain functionality, may communicate with the hypervisor to determine whether or not the functionality is authorized. In response to receiving service level information, the kernel-level component may approve or deny the functionality-enabling request of the application. In other embodiments, the kernel-level component may periodically communicate with the hypervisor to determine if any changes have occurred to the service level of the currently executing application. If any changes to the service level have occurred, the kernel-level component may initiate communication with the application to indicate to the application that certain functionality tied to the service level change be disabled or enabled.

In each of the above discussed methods, after communication between the application and the kernel-level component, the application may provide added or reduced functionality to a user.

In some embodiments, the functionality enabled through communication with the kernel-level component may be implemented within the kernel-level component itself. As noted above, the application, in order to operate in conjunction with the kernel-level component, may require some modification to implement the ability to deny some functionality and to communicate with the kernel-level component. In this example, to prevent the kernel-level component from being responsible for a large amount of processing, a single or a few important yet not processing-intensive functions may be implemented within the kernel-level driver. In this example, because the kernel-level component provides some of the functionality of the application, there is no need for any seeding, or secure communication between the application and the kernel-level component to enable functionality within the application. Instead, after the application and kernel-level component have been loaded, and some selected functionality of the application is invoked, the application calls the kernel-level component to execute the functionality.

In other embodiments, the functionality enabled within the application by the kernel-level component may depend on the type of virtual machine instance created. For example, different virtual machine instances may provide different levels of computing resources, and the level of functionality enabled by the kernel-level component within the application may depend on the level of computing resources provided by the virtual machine instance.

In other embodiments, multiple applications may be enabled by the same kernel-level component. Alternatively, each application may operate with a kernel-level component designed solely for that application. In such an example, given two different applications loaded within a virtual computing instance, there may be two respective kernel-level components loaded to communicate and enable functionality for each respective application.

Example Embodiment: Hypervisor & Virtual Machine

Figure 3:
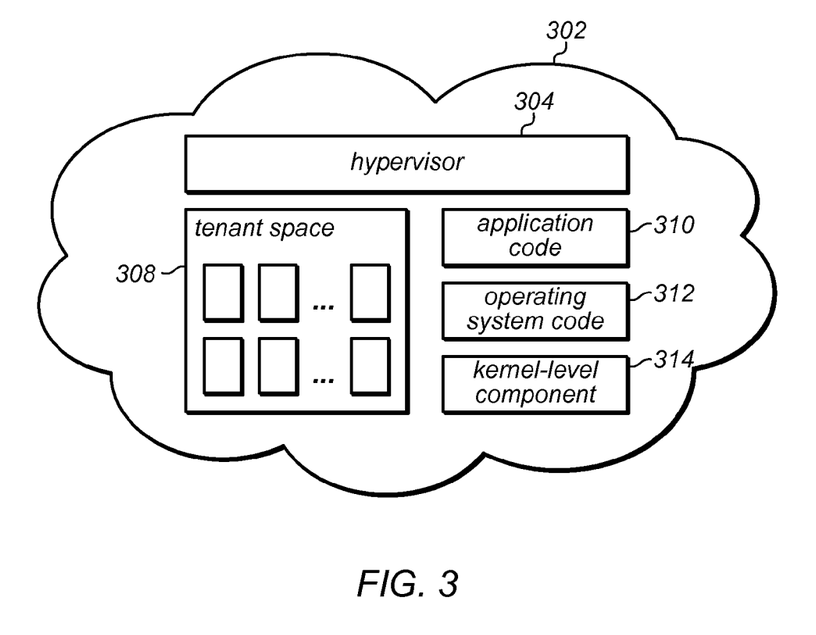
FIG. 3 illustrates aspects of a cloud computing environment, according to some embodiments.
Figure 4:
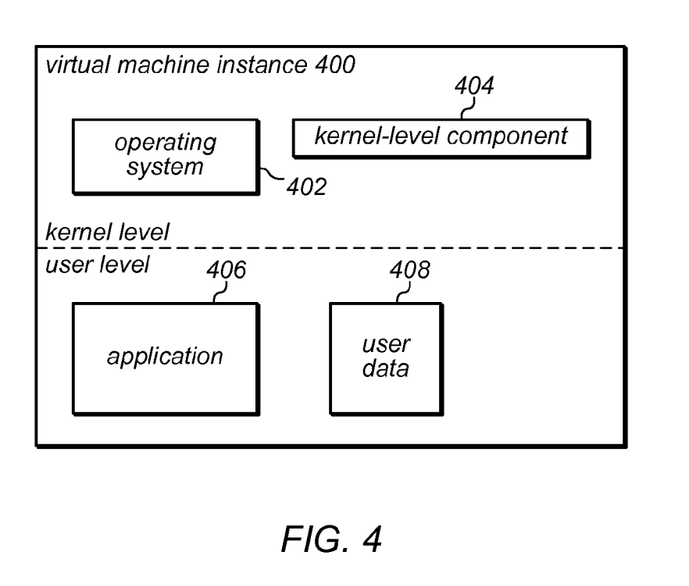
FIG. 4 illustrates a virtual computing instance, according to some embodiments.

FIG. 3 depicts elements present with a multi-tenant computing environment such as that described above with respect to FIG. 1. FIG. 4 depicts elements present within a virtual machine instance as the elements of the multi-tenant computing environment operate to perform steps according to the application binding system, as described above with respect to FIG. 2.

Referring back to the description of the application binding system discussed above with respect to FIG. 2, the elements presented in FIG. 3 may be used to support some of the processing steps of the application binding system.

Element 302 represents a multi-tenant virtual computing environment, or in other terms, a cloud computing environment. Hypervisor 304 is a process executing within the multi-tenant computing environment and serves, among other functions, as a virtual machine manager. Referring to the steps of FIG. 2, hypervisor 304 may serve to load the kernel in step 204, deny user access in step 206, load the application in step 208, and grant user access in step 212.

In response to a user request to initiate a cloud computing session or to execute an application within a cloud computing session, hypervisor 304 may create a virtual machine instance within tenant space 308 of the multi-tenant virtual computing environment. As depicted within FIG. 4, virtual machine instance 400 may be a result of the hypervisor creating a virtual machine instance.

Before loading the kernel-level component 314, hypervisor 304 may first access operating system code 312 within the multi-tenant virtual computing environment and boot the operating system within the virtual machine instance. The loading of the operating system by the hypervisor may result in operating system 402 being loaded within virtual machine instance 400.

In addition to loading the operating system, the hypervisor 304 may load kernel-level component 414 within virtual machine instance 400. A result of the loading of the kernel-level component by the hypervisor may be seen by kernel-level component 504 within the kernel space of virtual machine instance 400.

Application code 310 may be stored locally as in this embodiment, or remotely as depicted in FIG. 1. The loading of the application code by the hypervisor may result in application 406 being loaded within virtual machine instance 400.

Also within virtual machine 400 is user data 408. User data 408 may be related to application 406, or it may be related to other applications or data used by the user.

At the point that application 406 and kernel-level component 404 have been loaded, and access granted to the user, the user may begin executing application 406. As mentioned above, application 406 may have enabled the kernel-level component-enabled functionality upon being loaded, or application 406 may enable the functionality upon the user's attempted use of the functionality. In either case, the kernel-level component-enabled functionality may be enabled through communication between application 406 and kernel-level component 404.

Example Embodiment: Initializing a Virtual Machine

Figure 5:
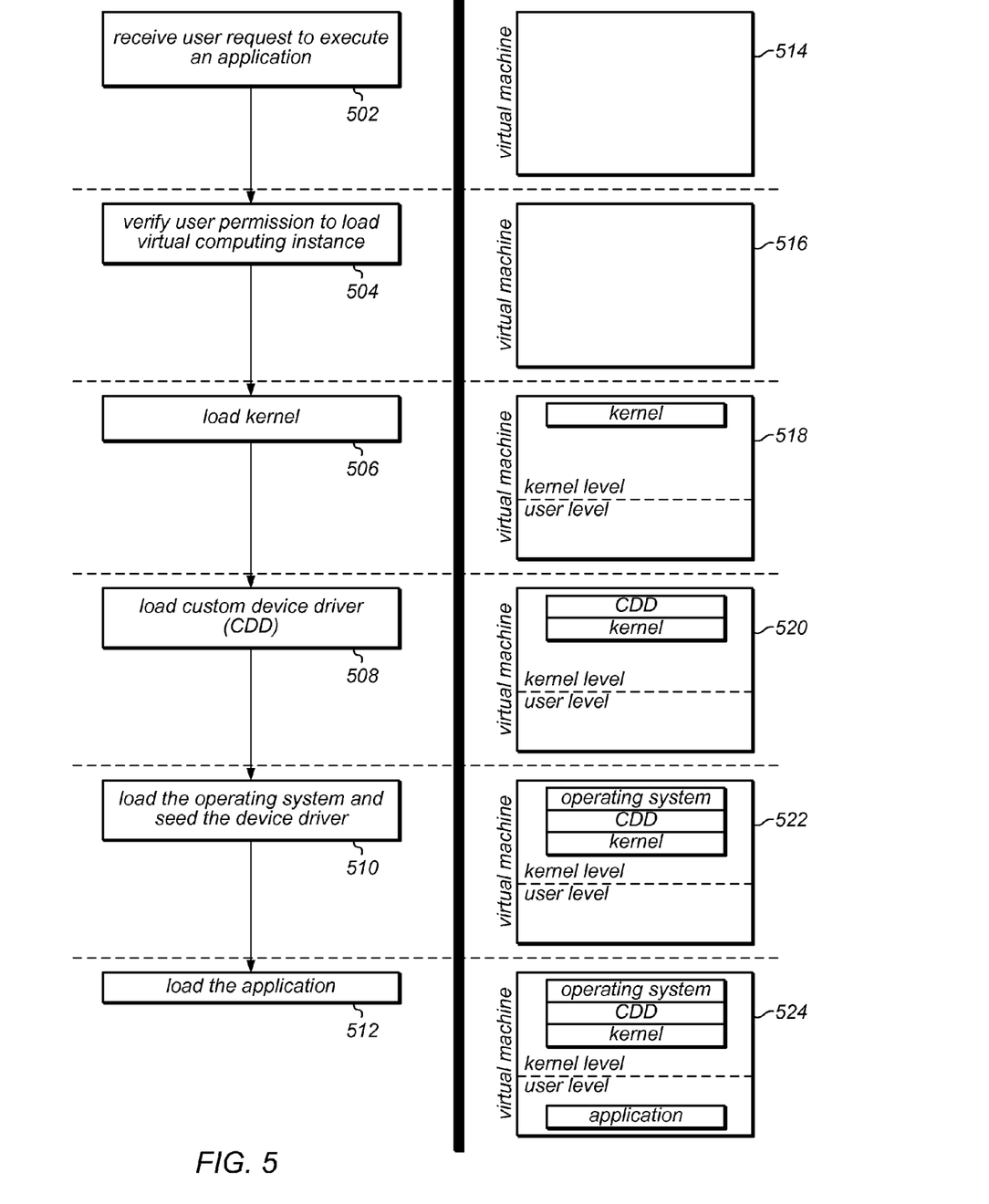
FIG. 5 illustrates a correlation between steps of the application binding system and the state of a virtual machine, according to some embodiments.

The sequence of actions and resulting states of the virtual machine instance described above with respect to FIGS. 3 and 4 may be seen presented in a different format within FIG. 5.

In this embodiment, creation of a virtual machine instance is done by a hypervisor within the cloud computing environment in response to a user request to execute an application, as reflected in step 502. At this time, as reflected by virtual machine state 514, the virtual machine is not yet loaded with a kernel, a kernel-level component, an operating system, or the application requested by the user.

At step 504, the hypervisor, or some other process within the cloud computing environment, verifies that the user has the appropriate permissions to both load the virtual machine instance and the application. At this time, as reflected by virtual machine state 516, the virtual machine is not yet loaded with a kernel, a kernel-level component, an operating system, or the application.

At step 506, the hypervisor loads a kernel, and this is reflected by virtual machine state 518. In some embodiments, the hypervisor may load a ramdisk image, which includes initialization scripts or routines executed by the kernel to load the kernel-level component, in this case, a custom device driver. Loading the custom device driver from the ramdisk is reflected in step 508, and the resulting virtual machine state can be seen in element 520. In this embodiment, before the ramdisk is loaded and until the ramdisk is removed, the user may be denied access. The period of time during which the user is denied access is beyond the loading time of the kernel-level component in earlier examples in order to prevent the user from accessing any kernel-level component files within the ramdisk.

Loading of the operating system is reflected in step 510, and the resulting virtual machine state is reflected in element 522. With the operating system loaded, the application can be loaded, as reflected in step 512, and the resulting virtual machine state is reflected in element 524.

Example Embodiment: Client/Server Environment

While the embodiments above have been presented in the context of a cloud computing environment, the application binding system may also be implemented within a client/server environment. In the client/server embodiment, a client system may be considered similar to a user at a computer outside of the cloud computing environment, and the server system may be considered similar to a cloud computing environment.

However, because a user may have total access to the files within the client and server systems, the kernel-level component in these examples may be built in to the operating system kernel. By having the kernel-level component built in to the operating system kernel, there may never be any object or modules related to the kernel-level component that may be accessible by a user, the only version of the kernel-level component would be the executable version within runtime memory.

In other embodiments within a client/server environment, users requesting access to an application may only be granted restricted access to the files within the client/server system. In such an embodiment, the kernel-level component may be stored in an area that is not accessible by the user, and since the user does not have access to the kernel-level component files, there may also be no need to deny the user access during the loading of the kernel-level component.

The remaining aspects and embodiments discussed above with respect to cloud computing environments apply similarly to a client/server environment.

Example Embodiment: Application Binding Module

Figure 6:
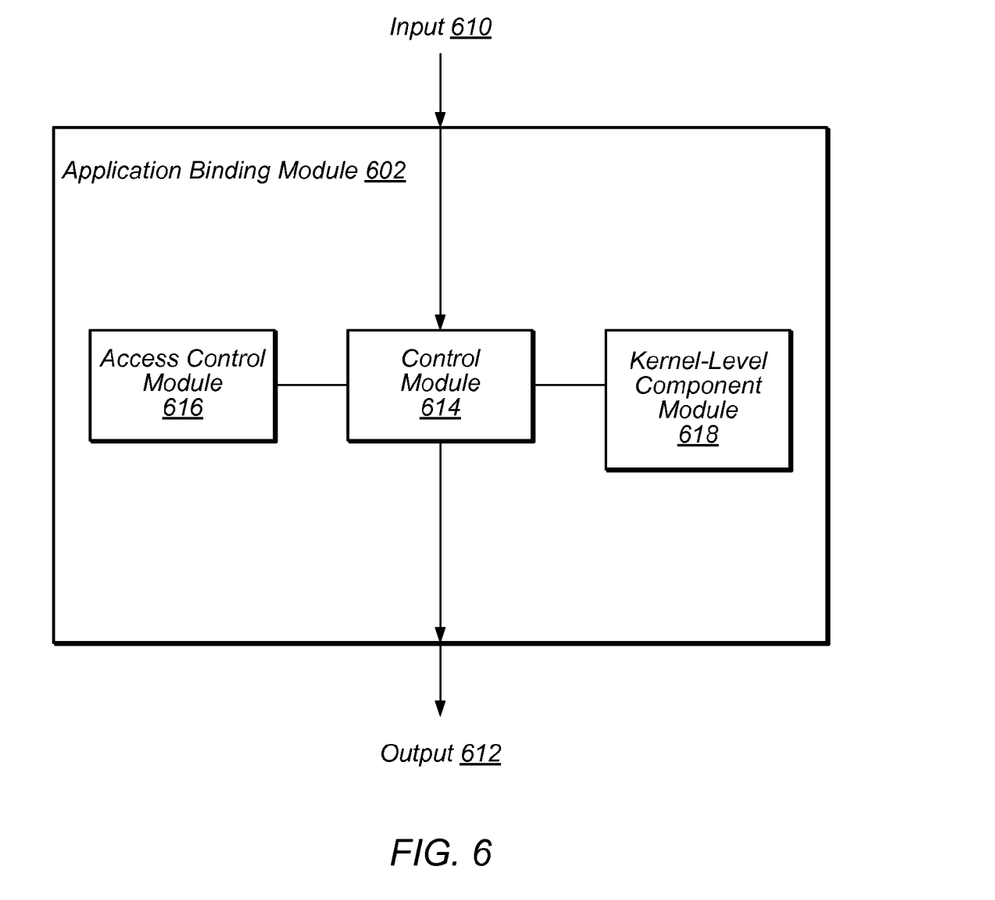
FIG. 6 illustrates modules that may implement the application binding system, according to some embodiments.

FIG. 6 illustrates one embodiment of the application binding system that may take form in application binding module 602. The functionality of the application binding module may exist within a hypervisor or within a process executing in conjunction with the hypervisor. The application binding module 602 may include a control module 614 for handling communication with a virtual machine manager, or hypervisor via input 610 and output 612. In the case that the application binding module is implemented within a hypervisor, control module may handle communication with the cloud computing environment and an application to be bound. The control module 614 may be coupled to an access control module 616, that may provide information to initiate the granting and denying of user access, as described above with respect to FIG. 2 and steps 206 and 210. The control module 614 may also be coupled to a kernel-level component module 618, which may store or access the kernel-level component that may be loaded within the virtual computing instance, as described above with respect to FIG. 2 and step 204. Each of the modules within the application binding module may be implemented by program instructions stored in a computer-readable storage medium and executable by one or more processors. Other embodiments of the modules within the application binding module may be at least partially implemented by hardware circuitry or firmware within one or more processors.

Example System

Figure 7:
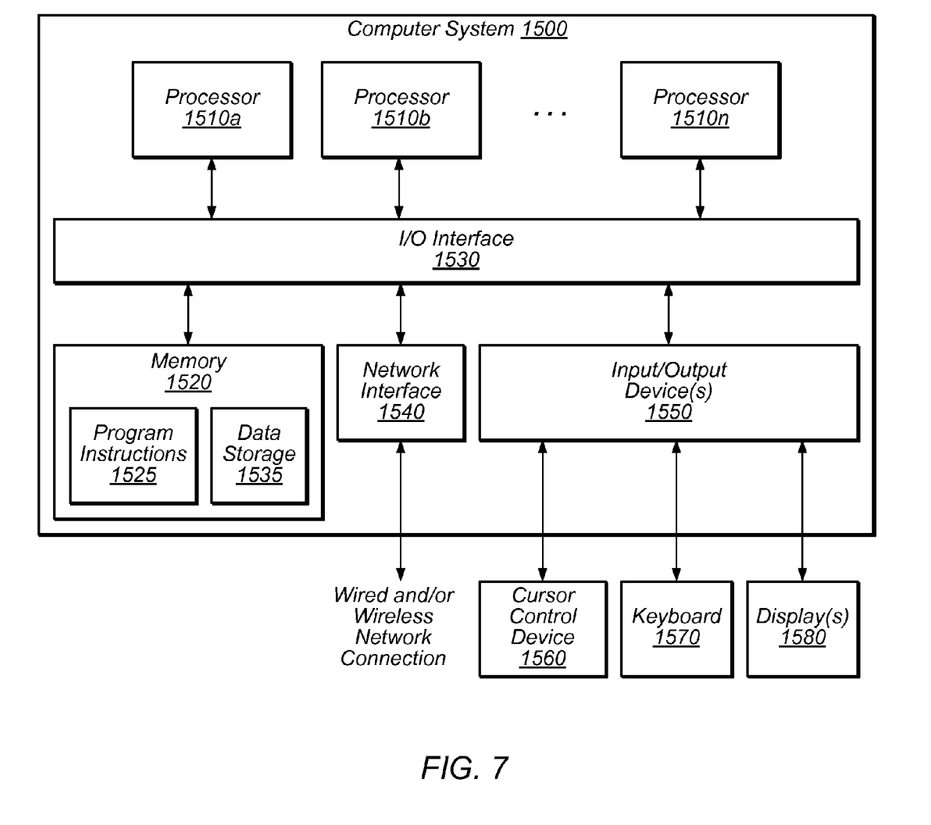
FIG. 7 illustrates an example computer system that may be used in some embodiments of the application binding system.

FIG. 7 illustrates a computer system 1500 that may execute embodiments of an application binding system. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors 1510a-1510n coupled to a system memory 1520 via an input/output (I/O) interface 1530. The computer system further includes a network interface 1540 coupled to the I/O interface, and one or more input/output devices 1550, such as a cursor control device 1560, a keyboard 1570, and display(s) 1580. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host CPU. In various embodiments, the image processing methods disclosed herein may, at least in part, be implemented by program instructions configured for execution on one of, or parallel execution on two or more of, such GPUs. The GPUs may implement one or more application programmer interfaces (APIs) that permit programmers to invoke the functionality of the GPUs. Suitable GPUs may be commercially available from vendors such as NVIDIA Corporation, ATI Technologies (AMD), and others.

System memory within the computer system may be configured to store program instructions 1525 and/or data 1535 accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an application binding system are shown stored within system memory as program instructions and data storage, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of an application binding system as described herein. In one embodiment, the program instructions may include software elements of embodiments of the modules discussed earlier in one of the embodiments of the application binding system. The data storage within the computer system may include data that may be used in other embodiments. In these other embodiments, other or different software elements and data may be included.

Those skilled in the art will appreciate that the computer system is merely illustrative and is not intended to limit the scope of the application binding system as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    receiving a request to execute an application within a virtual computing instance generated within a cloud computing environment;
    in response to receiving the request, loading a kernel-level component that is user-inaccessible within the virtual computing instance,
    wherein access is denied to the virtual computing instance after the virtual computing instance has been generated and is in an operable state, and while the kernel-level component is being loaded, and
    wherein at least some functionality of the application is enabled by the kernel-level component and at least some other functionality of the application is enabled independent of the kernel-level component;
    in response to receiving the request, loading the application within the virtual computing instance;
    allowing access the virtual computing instance to the application with the at least some functionality enabled by the kernel-level component, in response to completion of the kernel-level component being loaded; and
    enabling the application to be copied to another virtual computing instance such that copying the application does not copy the kernel-level component so that the copy of the application does not have the at least some functionality enabled.

2. The computer-implemented method of claim 1,
    wherein the virtual computing instance is one of a plurality of virtual computing instances within the cloud computing environment;
    wherein the virtual computing instance is accessed over a network; and
    wherein the cloud computing environment supports virtual computing instances for a plurality of different users accessing the cloud computing environment over the network.

3. The computer-implemented method of claim 1, further comprising:
    in response to loading the kernel-level component, seeding the kernel-level component with a seed value; and
    generating authentication information based on the seed value,
    wherein communication between the application and the kernel-level component comprises a message comprising the authentication information.

4. The computer-implemented method of claim 1, wherein said loading the kernel-level component within the virtual computing instance comprises:
    loading the kernel-level component within a kernel,
    wherein the kernel-level component is a device driver module outside of the kernel.

5. The computer-implemented method of claim 1, wherein said loading the kernel-level component within the virtual computing instance comprises:
    loading a kernel,
    wherein the kernel-level component is built into the kernel.

6. The computer-implemented method of claim 1, further comprising:
    disabling the at least some functionality of the application, in response to determining an absence of the kernel-level component.

7. The computer-implemented method of claim 1, wherein the at least some functionality of the application is enabled via communication between the application and the kernel-level component.

8. A computer-readable storage device storing program instructions, wherein the program instructions, when executed, perform operations comprising:
    receiving a request to execute an application within a virtual computing instance generated within a cloud computing environment;
    in response to receiving the request, loading a kernel-level component that is user-inaccessible within the virtual computing instance,
    wherein access is denied to the virtual computing instance after the virtual computing instance has been generated and is in an operable state, and while the kernel-level component is being loaded, and
    wherein at least some functionality of the application is enabled by the kernel-level component and at least some other functionality of the application is enabled independent of the kernel-level component;
    in response to receiving the request, loading the application within the virtual computing instance;
    allowing access by the virtual computing instance to the application with the at least some functionality enabled by the kernel-level component, in response to completion of the kernel-level component being loaded; and
    enabling the application to be copied to another virtual computing instance such that copying the application does not copy the kernel-level component so that the copy of the application does not have the at least some functionality enabled.

9. The computer-readable storage device of claim 8,
    wherein the virtual computing instance is one of a plurality of virtual computing instances within the cloud computing environment;

wherein the virtual computing instance is accessed over a network; and wherein the cloud computing environment supports virtual computing instances for a plurality of different users accessing the cloud computing environment over the network.

10. The computer-readable storage device of claim 8, wherein the program instructions, when executed, further perform:

in response to loading the kernel-level component, seeding the kernel-level component with a seed value; and generating authentication information based on the seed value, wherein communication between the application and the kernel-level component comprises a message comprising the authentication information.

11. The computer-readable storage device of claim 8, wherein said loading the kernel-level component within the virtual computing instance comprises:

loading the kernel-level component within a kernel, wherein the kernel-level component is a device driver module outside of the kernel.

12. The computer-readable storage device of claim 8, wherein said loading the kernel-level component within the virtual computing instance comprises:

loading a kernel, wherein the kernel-level component is built into the kernel.

13. The computer-readable storage device of claim 8, wherein the program instructions, when executed, further perform:

disabling the at least some functionality of the application, in response to determining an absence of the kernel-level component.

14. The computer-readable storage device of claim 8, wherein the at least some functionality of the application is enabled via communication between the application and the kernel-level component.

15. A system, comprising:

at least one processor; and a memory storing program instructions that, when executed by the at least one processor, perform operations including:

receiving a request to execute an application within a virtual computing instance generated within a cloud computing environment;

in response to receiving the request, loading a kernel-level component that is user-inaccessible within the virtual computing instance, wherein access is denied to the virtual computing instance after the virtual computing instance is operational and is in an operable state, and while the kernel-level component is being loaded, and wherein at least some functionality of the application is enabled by the kernel-level component and at least some other functionality of the application is enabled independent of the kernel-level component;

in response to receiving the request, loading the application within the virtual computing instance;

allowing access by the virtual computing instance to the application with the at least some functionality enabled by the kernel-level component, in response to completion of the kernel-level component being loaded; and enabling the application to be copied to another virtual computing instance such that copying the application does not copy the kernel-level component so that the copy of the application does not have the at least some functionality enabled.

16. The system of claim 15, wherein the virtual computing instance is one of a plurality of virtual computing instances within the cloud computing environment;

wherein the virtual computing instance is accessed over a network; and wherein the cloud computing environment supports virtual computing instances for a plurality of different users accessing the cloud computing environment over the network.

17. The system of claim 15, wherein the program instructions, when executed, further perform:

in response to loading the kernel-level component, seeding the kernel-level component with a seed value; and generating authentication information based on the seed value, wherein communication between the application and the kernel-level component comprises a message comprising the authentication information.

18. The system of claim 15, wherein said loading the kernel-level component within the virtual computing instance comprises:

loading the kernel-level component within a kernel, wherein the kernel-level component is a device driver module outside of the kernel.

19. The system of claim 15, wherein said loading the kernel-level component within the virtual computing instance comprises:

loading a kernel, wherein the kernel-level component is built into the kernel.

20. The system of claim 15, wherein the program instructions, when executed, further perform:

disabling the at least some functionality of the application, in response to determining an absence of the kernel-level component.

21. The system of claim 15, wherein the at least some functionality of the application is enabled via communication between the application and the kernel-level component.

* * * * *

UNITED STATES PATENT AND TRADEMARK OFFICE
CERTIFICATE OF CORRECTION

| | | |
|---|---|---|
| PATENT NO. | : 8,799,898 B2 | Page 1 of 1 |
| APPLICATION NO. | : 13/149822 | |
| DATED | : August 5, 2014 | |
| INVENTOR(S) | : Andrew G. Davis | |

It is certified that error appears in the above-identified patent and that said Letters Patent is hereby corrected as shown below:

In the Claims

Column 13, line 55, after "allowing access", insert -- by --, therefor.

Signed and Sealed this
Eighteenth Day of November, 2014

Michelle K. Lee
*Deputy Director of the United States Patent and Trademark Office*